E. F. ROSE.
ALFALFA MILL.
APPLICATION FILED MAY 20, 1909.
1,006,596.
Patented Oct. 24, 1911.
5 SHEETS—SHEET 4.
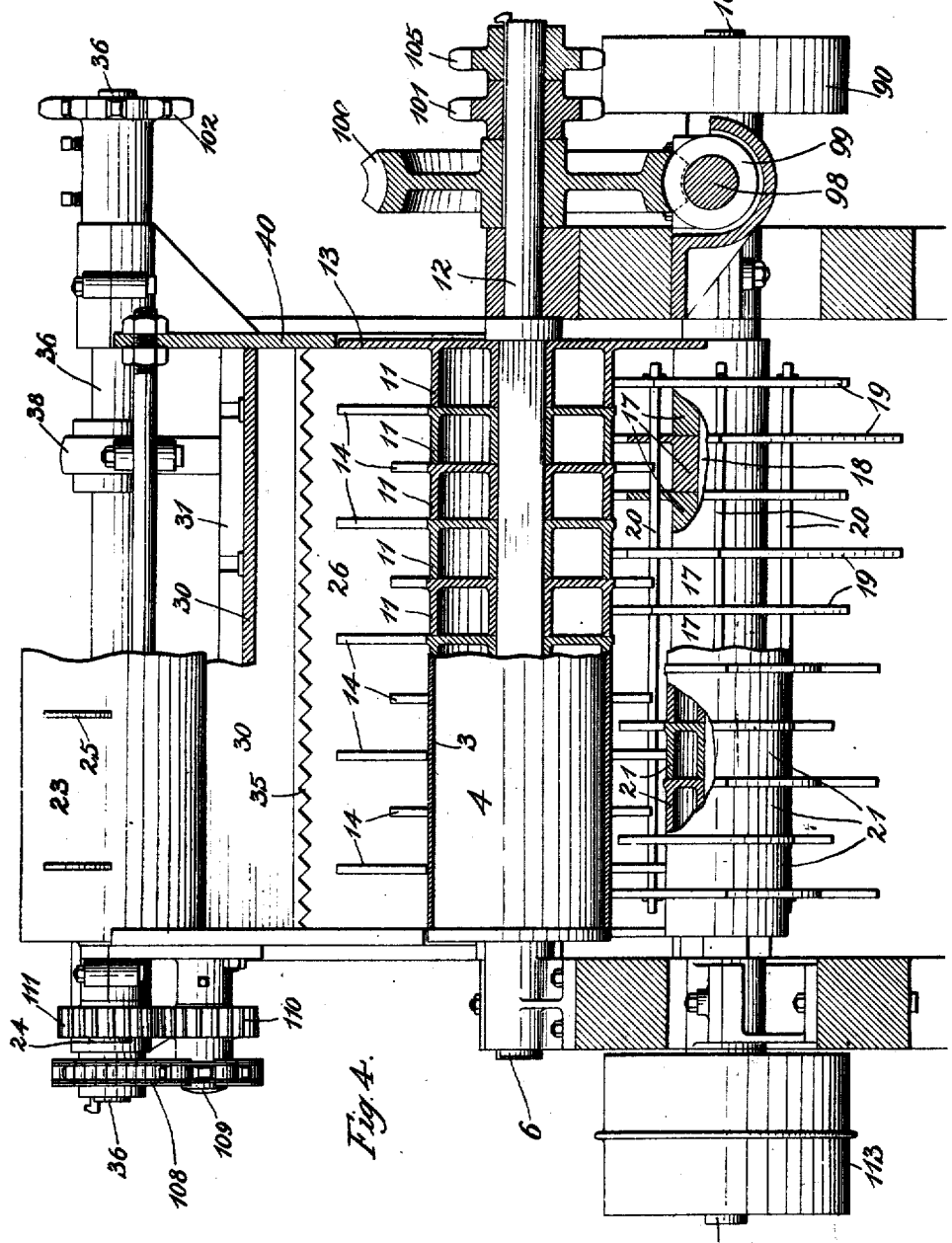
Witnesses:
J. C. Quick.
Geo. L. Chindahl
Inventor:
Edward F. Rose
By Luther L. Miller
Attorney.

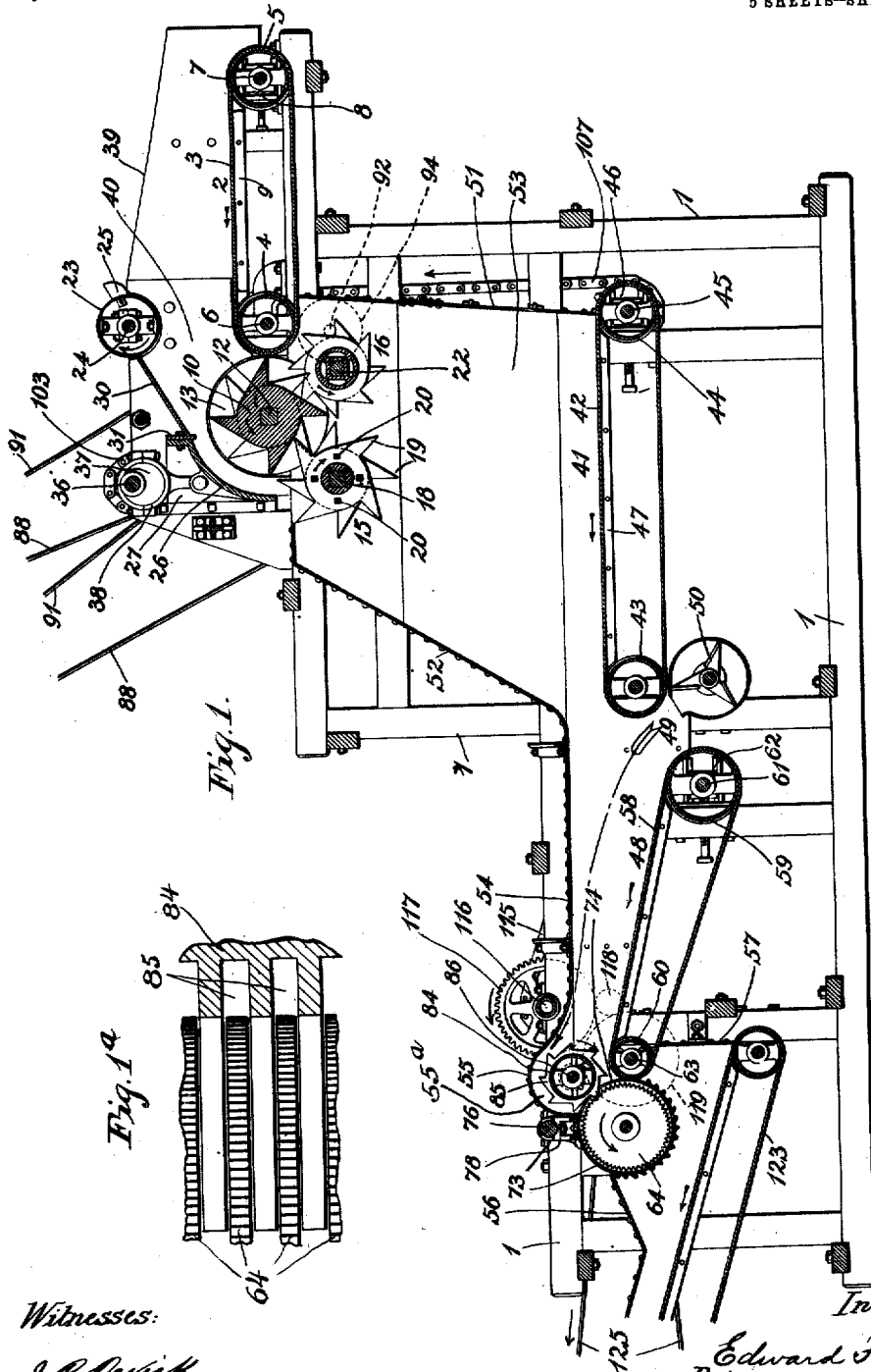

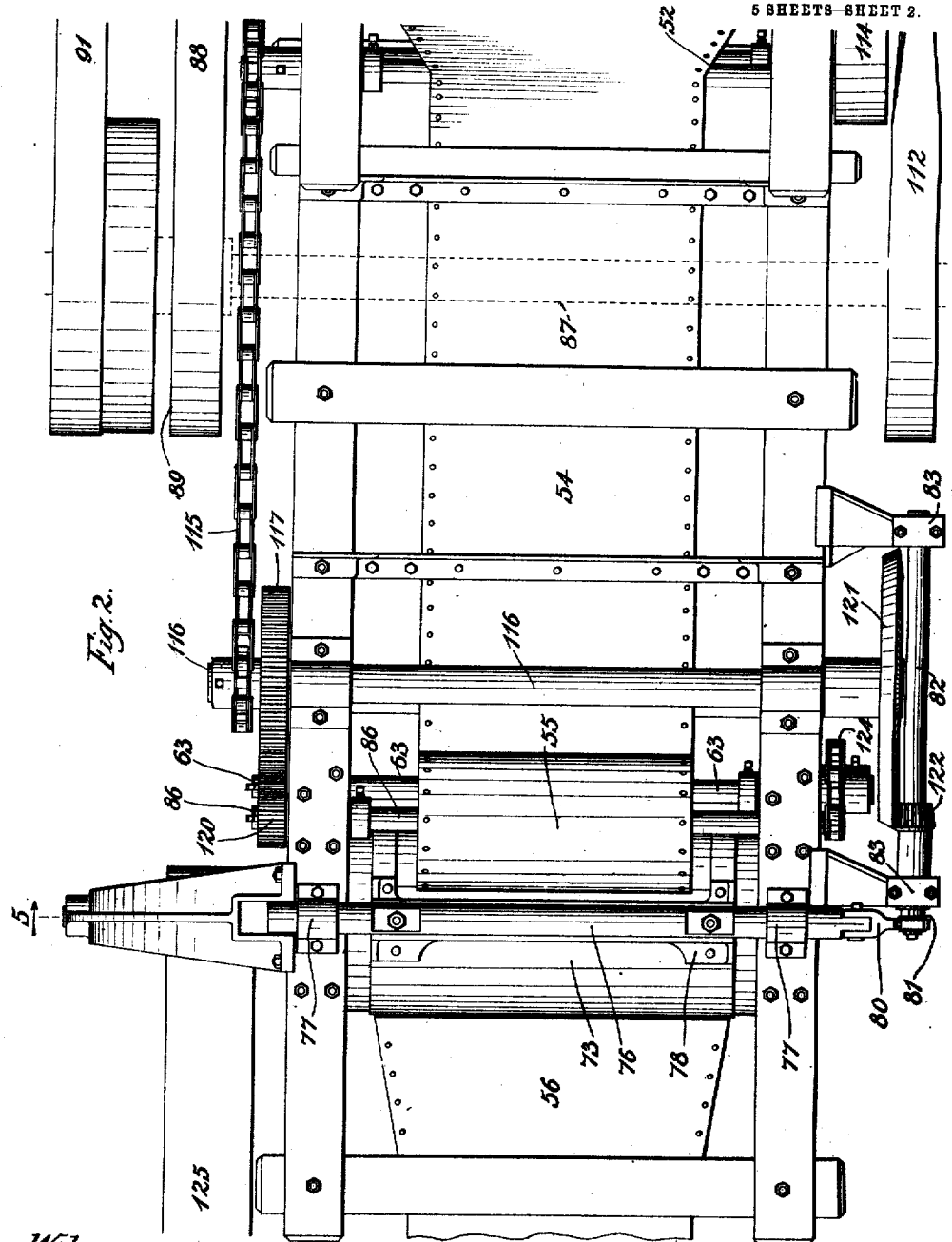

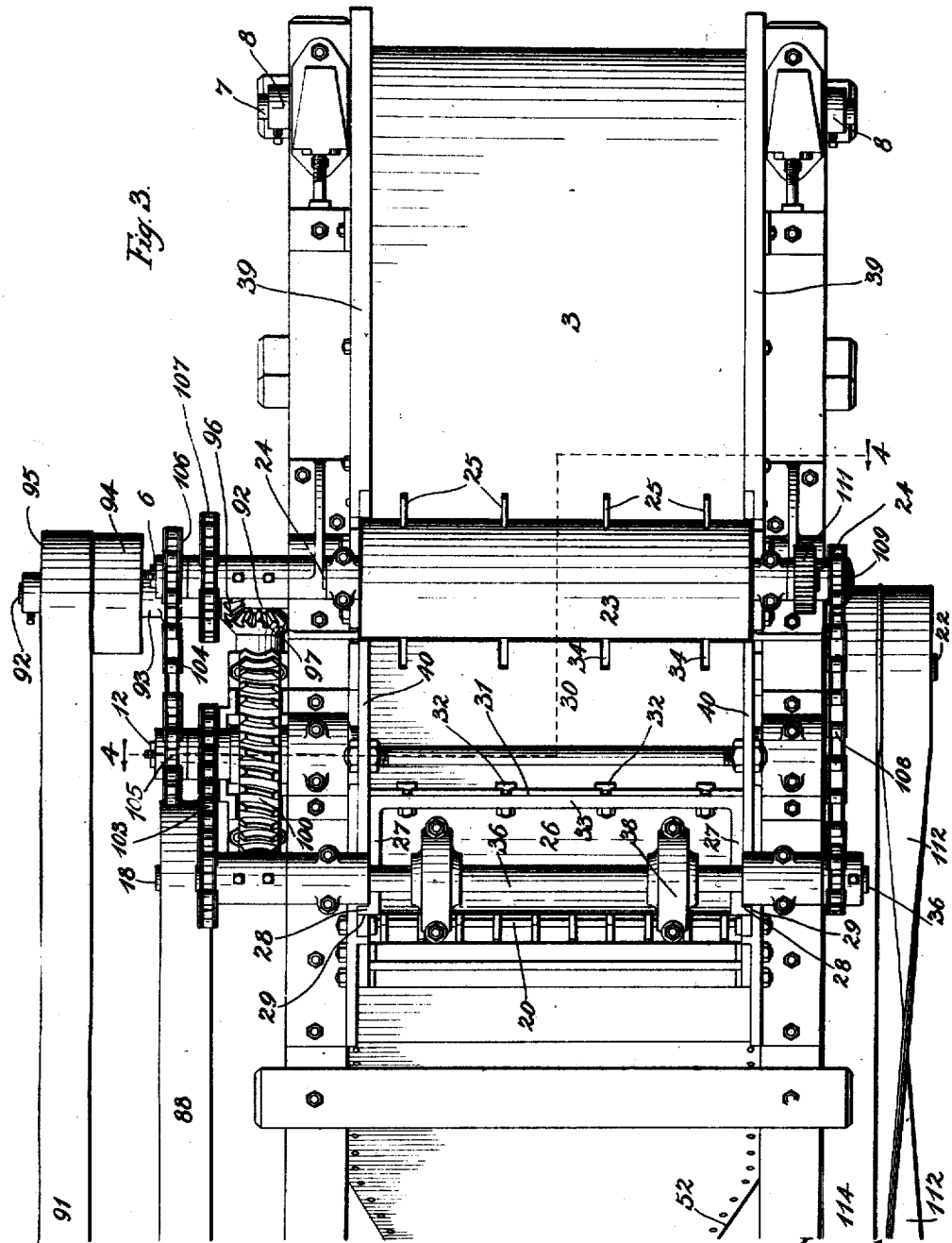

E. F. ROSE.
ALFALFA MILL.
APPLICATION FILED MAY 20, 1909.
1,006,596.
Patented Oct. 24, 1911.
5 SHEETS—SHEET 5.
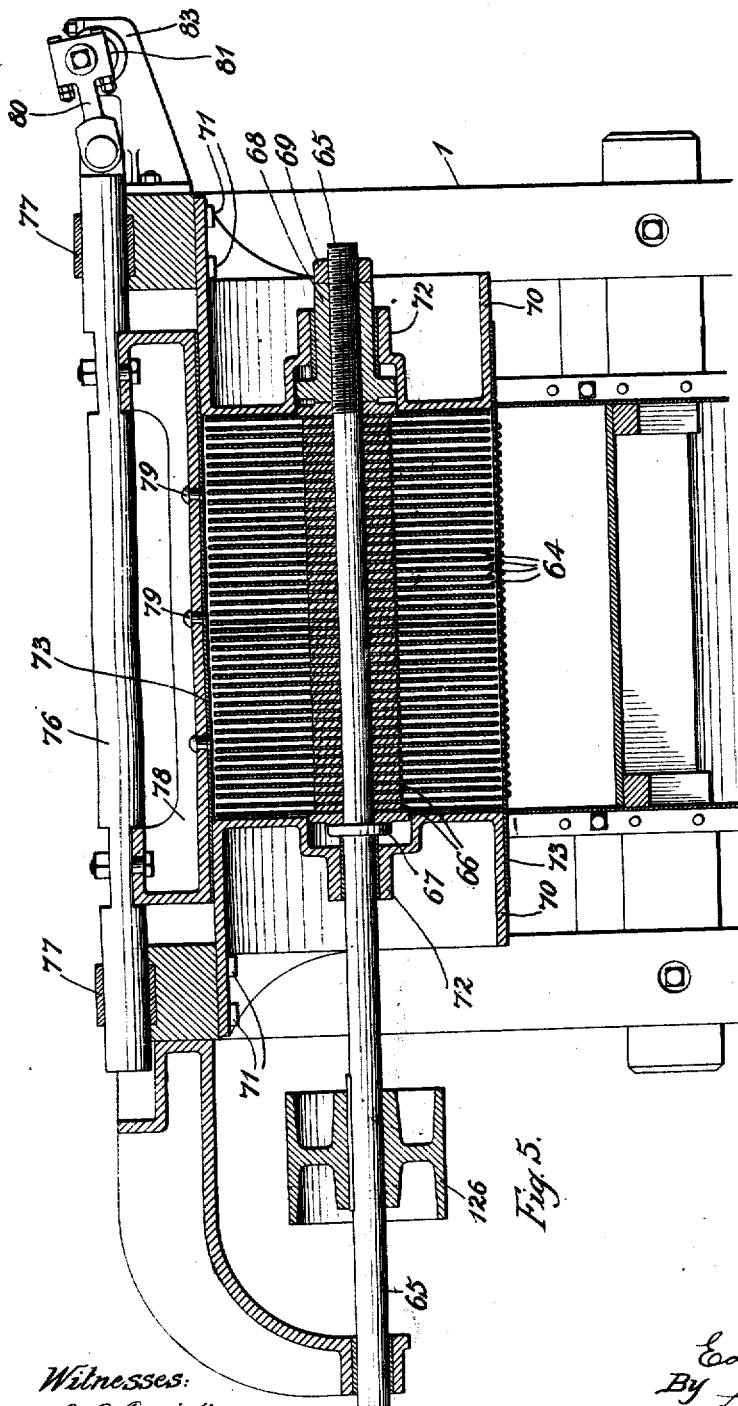
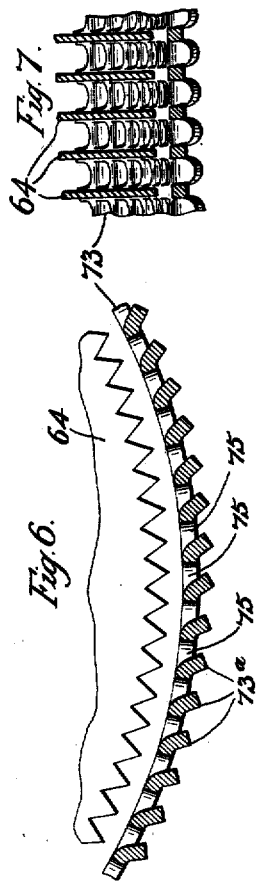
Witnesses:
J. C. Devick.
Geo. L. Chinsdahl
Inventor:
Edward F. Rose
By Luther L. Miller
Attorney

UNITED STATES PATENT OFFICE.

EDWARD F. ROSE, OF NEBRASKA CITY, NEBRASKA, ASSIGNOR TO KANSAS CITY FEED COMPANY, LIMITED, OF PRESCOTT, ARIZONA TERRITORY, A CORPORATION OF ARIZONA TERRITORY.

ALFALFA-MILL.

1,006,596.  Specification of Letters Patent.  Patented Oct. 24, 1911.

Application filed May 20, 1909. Serial No. 497,335.

*To all whom it may concern:*

Be it known that I, EDWARD F. ROSE, a citizen of the United States, residing at Nebraska City, in the county of Otoe and State of Nebraska, have invented certain new and useful Improvements in Alfalfa-Mills, of which the following is a specification.

The object of this invention is to produce an improved machine for reducing alfalfa hay and the like without reducing a material portion of the leaves to powder.

In the accompanying drawings, Figure 1 is a longitudinal vertical section through an alfalfa mill embodying the features of my invention. Fig. 1ª is a detail view of the reducing device. Figs. 2 and 3 constitute a top plan view of the machine on a larger scale than that in Fig. 1. Fig. 4 is a vertical transverse section taken substantially on the plane of dotted line 4 4 of Fig. 3. Fig. 5 is a section on line 5 of Fig. 2. Figs. 6 and 7 are detail views of a reciprocatory shell.

The embodiment herein shown of my invention may be briefly described as comprising means for stripping the leaves from the stalks, means for reducing the stalks, means for conveying the stalks from the first mentioned means to the second mentioned means, and means for preventing the leaves that have been stripped off the stalks from being acted upon by the stalk-reducing mechanism.

As illustrated in Fig. 1, the various mechanisms of the machine are supported upon a framework 1 which may be of any suitable construction.

The alfalfa hay is carried to the leaf-and-stalks-separating means, in this instance, by an endless belt conveyer 2 comprising the belt 3 and the two rollers 4 and 5. The roller 4 is fixed upon a shaft 6 mounted in suitable bearings in the framework, while the roller 5 is carried by a shaft 7 which preferably is mounted in slidable bearings 8 in order that said roller may be moved to take up slack in the belt. The upper run of the belt 3 may be supported in any suitable way, as, for example, by means of rails 9 underlying the edges of said upper run.

The leaf-and-stalk-separating means comprises, in this instance, a roll 10 which may be built up of sections 11, as indicated in Fig. 4, which sections are mounted upon the squared portion of a shaft 12. The end sections of the roll 10 have annular flanges 13 thereon. The intermediate sections of said roll carry peripheral teeth 14, the teeth of said sections being staggered. As shown in Fig. 4, the teeth 14 are spaced longitudinally of the roll 10 relatively far apart.

Below the roll 10 and at opposite sides thereof are rolls 15 and 16. The roll 15, in this instance, consists of sections 17 (Fig. 4) mounted upon the squared portion of a shaft 18 and carrying peripheral teeth 19 which alternate with the teeth upon the roll 10. A plurality of rods 20 extend longitudinally of the roll 15 at a suitable distance from the axis of said roll for a purpose to appear hereinafter. The roll 16 consists of sections 21 carrying peripheral teeth which alternate with the teeth 19 upon the roll 15. Said sections are supported upon a shaft 22.

The roll 10 is driven at a relatively low speed, say thirty-five revolutions per minute, while the rolls 15 and 16 run at a relatively high speed, as, for example, 800 revolutions per minute. The alfalfa hay is carried by the teeth of the roll 10 around into the space between said roll and the roll 15, where the difference in speed of rotation of said rolls causes the stems or stalks to be broken and the leaves to be stripped therefrom. The roll 16 serves to break the stems and strip the leaves of any hay which may find its way downward between the roll 10 and the conveyer 2, and also serves to clear the roll 10 of any stems which may tend to adhere thereto.

To assist in feeding the alfalfa hay forward to the rolls 10, 15 and 16, I provide a cylindrical feed roller 23 fixed upon a shaft 24 carrying a longitudinal row of spaced fingers 25. A guide plate 26 curved substantially upon the arc of a circle concentric with the axis of the shaft 12 is provided with end flanges 27, each of which has a guide rib 28 thereon which is slidably mounted in a guide groove 29 (Fig. 3). A plate 30 is attached at one edge to the forward portion of the curved guide plate 26, said plate extending between said guide plate and the feed roller 23 in an inclined position. The plate 30 is preferably adjustably connected with the guide plate 26 in order that its position may be adjusted for varying lengths of hay. I have herein shown a flange 31 upon the plate 30, which flange is slotted to receive bolts 32 extending through a flange 33 upon the guide plate. The forward edge of the plate 30 is slotted as at 34 for the passage of the fingers 25 upon the feed roller 23. The lower edge of the plate 30 may be serrated, as shown at 35 in Fig. 4. As the roller 23 revolves, the fingers 25 urge the hay forward toward the roll 10, the plate 30 and the guide plate 26 being moved upwardly to provide increased space for the hay thus fed forward. Said guide plate 26 and the plate 30 are then moved downward, the plate 30 stripping the hay from the fingers 25, and the guide plate 26 confining the hay between itself and the roll 10 so that the teeth upon said roll may move the hay along to the roll 15. The means herein shown for thus moving the guide plate 26 and the stripper plate 30 comprises a shaft 36 carrying eccentrics 37, the eccentric straps 38 being connected to the guide plate, as shown in Fig. 1. At each side of the conveyer 2 are guide walls 39 which form continuations of the vertical side walls 40. The stems and the leaves stripped from said stems fall from between the rolls 15 and 16 onto suitable carrying means, as, for example, an endless belt conveyer 41, the endless belt 42 thereof being mounted upon rollers 43 and 44. The roll 44 is mounted upon a shaft 45 which preferably is carried in adjustable bearings 46. The upper run of the belt 42 may be supported by means such as rails 47.

Forward of the conveyer 41 is another conveyer 48 constituting virtually a continuation of the first mentioned conveyer, an open space 49 being provided between the forward end of the conveyer 41 and the rear end of the conveyer 48. The leaves and stems are transferred across said open space by an air blast created by suitable means, as, for example, a fan 50. Any foreign matter contained in the hay which would be injurious to the reducing mechanism, such as stones or metallic articles, will drop through the space 49 and fail to be carried forward to the reducing devices. The space between the separating mechanism and the reducing mechanism is preferably inclosed within a practically air-tight chamber. I have herein shown sheet metal inclosing walls 51, 52, 53, 54, 55, 56 and 57.

The conveyer 48 consists of an endless belt 58 carried by rollers 59 and 60, the roller 59 being mounted upon a shaft 61 which may be carried in adjustable bearings 62, as shown. The roller 60 is fixed upon a shaft 63.

The reducing mechanism comprises a gang of rotary saws 64 mounted upon a shaft 65 and driven at a high rate of speed, said saws being spaced apart by means of washers 66. The saws and the washers are clamped together and secured to the shaft 65 by means comprising a shoulder or collar 67 on the shaft and a sleeve 68 screw-threaded on said shaft. A jam nut 69 may be employed to lock the elements of the rotary grinding device together.

Two substantially cylindrical heads 70 are fixed in the opposite sides of the supporting frame 1 by means of bolts 71, and provide bearings 72 for the shaft 65 and the sleeve 68. The saws 64 are of slightly less diameter than the heads 70.

Slidably mounted upon the heads 70 and inclosing the saws 64 is a cylindrical shell 73 having a feeding opening 74 therein extending from a point near the roller 60 to a point near the top of said shell. The portion of the shell extending from the roller 60 to the rear side of the saws is perforated, as indicated in Figs. 1, 6 and 7. These perforations may be formed in various ways. In the drawings I have shown them as formed by punching up tangs 73$^a$ from the shell 73 so as to form openings 75 which are inclined at an angle with the radius of said shell. The shell 73, in this instance, is arranged to be reciprocated longitudinally of the series of saws 64 by means herein shown as comprising a rod 76 slidably mounted in bearings 77 and carrying a bracket 78 to which the shell 73 is fixed by rivets 79. A pitman 80 connects the rod 76 with a crank 81 formed upon the end of a shaft 82 (Fig. 2), the latter being rotatably mounted in bearings 83.

Forwardly of the saws 64 and above the conveyer 48 is a toothed feed roller 84 having annular peripheral grooves 85 milled therein to accommodate the peripheral portions of the saws. The feed roller 84 is mounted on a shaft 86. The greater part of the reduction of the stems is effected between the saws and the roll 84. I have obtained good results by driving the feed roll 84 at the rate of 160 revolutions per minute. The roll 84 runs beneath the curved hood or casing 55, the latter being sufficiently large to provide a clear space 55$^a$ above the roll for the passage of the leaves, as will appear hereinafter.

The various mechanisms of the machine may be driven in any suitable way. I have herein shown them as driven from a counter shaft 87 (Fig. 2). A belt 88 runs over a pulley 89 on the countershaft and a pulley 90 (Fig. 4) on the shaft 18.

91 is a belt conveying power from the countershaft to a shaft 92 mounted in a suitable bracket 93 secured to the supporting frame. The shaft 92 carries a tight pulley 94 and a loose pulley 95. Fixed on the shaft 92 is a bevel gear 96 (Fig. 3) which meshes with a similar gear 97 on a shaft 98 (Fig. 4). A worm 99 fast on the shaft 98 meshes with a worm wheel 100 fixed upon the shaft 12. Sprocket wheels 101 and 102 are fixed upon the shafts 12 and 36, respectively, and carry a chain belt 103. A chain 104 running over sprocket wheels 105 106 conveys power from the shaft 12 to the shaft 6.

107 is a chain extending around sprocket wheels on the shafts 6 and 45. A chain 108 transmits power from the eccentric shaft 36 to a sprocket wheel rotatably mounted upon a stub shaft 109.

110 is a pinion fixed with relation to the last mentioned sprocket wheel, and meshing with a pinion 111 fast on the shaft 24. The shafts 24 and 36 revolve at the same rate.

A belt 112 extends from the countershaft to a double-faced pulley 113 fixed on the shaft 22. From said pulley runs a belt 114 that drives the fan shaft. A chain belt 115 (Fig. 2) conveys power from said fan shaft to a shaft 116 upon which is mounted a spur gear wheel 117 that meshes with an idler gear 118 (Fig. 1) which in turn meshes with a spur gear 119 on the conveyer shaft 63. The gear 119 drives a pinion 120 on the shaft 86. Upon one end of the shaft 116 is fixed a bevel spur gear 121 (Fig. 2) meshing with a pinion 122 on the crank shaft 82. A belt conveyer 123 is driven from the shaft 63 through a chain belt 124. The saws 64 are driven through the medium of a belt 125 running over a pulley 126 (Fig. 5) to a suitably driven shaft (not shown).

In operation, alfalfa hay is placed upon the conveyer 2 and carried forward by said conveyer to the leaf and stem separating mechanism. The fingers 25 upon the feed roller 23 urge the hay forward as the guide plate 26 and the stripper plate 30 rise. Said plates then descend, stripping the hay from the fingers 25 and pressing it into contact with the slowly revolving roll 10. The teeth 35 slightly retard the movement of the hay, and thus tend to make the feed uniform in quantity. The roll 10 carries the hay forward to the rapidly revolving roll 15, the teeth of which, alternating with the teeth upon the roll 10, break the stems and strip the leaves therefrom. The teeth upon the rolls 10 and 15 being spaced relatively far apart, there is practically no tendency to cut up or grind the leaves. The square bars 20 assist to break any stems that come into contact with said bars. The worm gear drive for the roll 10 prevents said roll from being driven, and caused to rotate more rapidly than it should, by the action of the swiftly revolving roll 15 upon the hay carried by said roll 10. The leaves and the broken stems drop onto the conveyer 41 and are carried forward to the space 49 across which the leaves and stems are blown by the fan 50, the stems falling onto the conveyer 48. The stems carried to the rapidly revolving saws 64 by the conveyer 48 and the feed roller 84 are reduced by said saws to fragments of the desired size. The material is carried forward between the saws and the shell 73 until it reaches the perforated portion of said shell where the pieces which are small enough drop through the perforations, the shell acting as a shaking screen by reason of its reciprocatory motion. The tangs 73ª practically blank the openings 75, thereby preventing the stems from being forced through said openings by centrifugal force before the stems are sufficiently reduced. The stems that lie between the saws 64 and are carried around by said saws act as a brush in assisting the saws to discharge the cut material through the perforated shell 73. As the stems are carried around the space between the saws and the shell, said stems are moved longitudinally of the gang of saws by the shell until they are gradually reduced to a size enabling them to pass out through the perforations 75. The leaves being lighter than the stems, are blown by the fan 50 along the course indicated by the dotted arrow in Fig. 1, and, passing through the space 55ª, enter the screen 73 and quickly pass through the perforations 75. The feed roller 84 rotates relatively slowly, while the saws revolve so rapidly as very quickly to dispose of the stems fed to them by said feed roller, there being no accumulation of material in the space between the cylinder 73 and the saws. In their rotation the saws create so strong an air current that the leaves are blown through the perforations 75 without being cut up by the saws. The diameter, thickness and spacing of the saws, their speed of rotation, the length of stroke of the perforated shell 73 and its rate of movement, the size of the perforations of said shell and the width of the space between said shell and the saws are determined by the capacity desired and the degree of fineness to which the material is to be reduced. I have found that only a negligible portion of the leaves is reduced and that the stems are reduced to pieces about one-fourth of an inch long, when the saws are nine inches in diameter, three-sixty-fourths of an inch in thickness, spaced one-fourth of an inch apart, and driven at the rate of 2400 R. P. M., the shell 73 having 360 one-inch strokes per minute and the perforations 75 being one-fourth of an inch wide. The material passing through the shell 73 is handled in any suitable way. It may be discharged upon a conveyer 123, as shown.

I would have it understood that the invention is not limited to the details of construction and operation herein set forth, for various modifications will occur to those skilled in the art.

I claim as my invention:

1. In a machine of the character described, a stem-breaking mechanism comprising a roll having peripheral teeth, said teeth being spaced relatively far apart longitudinally of the roll, a roll having peripheral teeth intermeshing with the teeth of the first roll, said rolls rotating in opposite directions, a third roll having peripheral teeth that intermesh with the teeth of the first roll, means for rotating the rolls, the first and third rolls rotating in the same direction, the first roll being located above and between the other rolls, and means for guiding the material between the first and second rolls.

2. In an alfalfa mill, in combination, stem-breaking and leaf-stripping means, means for moving hay toward said first mentioned means, and means for stripping the hay from said moving-means.

3. In an alfalfa mill, in combination, stem-breaking and leaf-stripping means, a feed roll having a peripheral row of fingers for moving hay toward said means, and means for stripping the hay from said fingers.

4. In an alfalfa mill, in combination, stem-breaking and leaf-stripping means, a feed roll having a peripheral row of fingers for moving hay toward said means, a device adapted to strip hay from said fingers, and means for reciprocating said device.

5. In an alfalfa mill, in combination, stem-breaking and leaf-stripping means, a device for periodically pressing hay into engagement with said means, a feed roll, a device for stripping hay from said feed roll, said devices being secured together, and means for reciprocating said devices.

6. In an alfalfa mill, in combination, stem-breaking and leaf-stripping means comprising a roll, a curved plate arranged adjacent to said roll, a feed roll, a plate for stripping hay from said feed roll, said plates being secured together, and means for reciprocating said plates.

7. In an alfalfa mill, in combination, stem-breaking and leaf-stripping means comprising a roll, a conveyer arranged to convey hay to said roll, a curved plate arranged adjacent to said roll at the side opposite to said conveyer, a feed roll above the discharge end of said conveyer, a plate for stripping hay from said feed roll, said plates being secured together, and means for reciprocating said plates.

8. In an alfalfa mill, in combination, stem-breaking and leaf-stripping means comprising a roll, a conveyer arranged to convey hay to said roll, a presser plate arranged adjacent to said roll at the side opposite to said conveyer, and curved on the arc of a circle substantially concentric with said roll, a feed roll above the discharge end of said conveyer, a stripper plate attached at one edge to the upper edge of said presser plate, the opposite edge of said stripper plate lying adjacent to said feed roll, and means for reciprocating said plates.

9. In an alfalfa mill, in combination, means for reducing stems; a feed roll coöperating with said reducing means, the stems passing between said reducing means and one side of said feed roll; means forming a passageway for leaves at the other side of said feed roll; and means located forwardly of the feed roll for causing leaves to pass through said passageway.

10. In an alfalfa mill, in combination, a rotary reducing device, a curved screen adjacent to said reducing device, a roll coöperating with said reducing device, the stems passing between said reducing device and one side of said roll, means forming a passageway for leaves at the other side of said roll, said passageway communicating with the interior of said screen and means for causing leaves to pass through said passageway.

11. In an alfalfa mill, in combination, a gang of rotary saws, a toothed roll having annular peripheral grooves therein to accommodate the peripheral portions of the saws, means for rotating said saws at a high speed, and means for rotating said roll in the opposite direction at a relatively low speed.

12. In an alfalfa mill, in combination, saws for reducing stems, a feed roll coöperating with said saws, means for conducting leaves and stems toward said saws and roll, a fan for inducing an air current through the material advancing toward the saws and roll so as to separate the leaves from the stems, and means forming a passageway for leaves around the roll at the side opposite the saws, the air current carrying the leaves through said passageway.

13. In a machine of the character described, a casing, means mounted within said casing for partially reducing the material, means for feeding the material to said reducing means, a conveyer for receiving and conveying the partially reduced material, a second conveyer having its receiving end located below and separated from the discharge end of the first conveyer, means for causing an upward current of air through the space between the discharge end of the first conveyer and the receiving end of the second conveyer to carry the material across said space, and a cutter arranged to operate upon the material carried by the second conveyer.

EDWARD F. ROSE.

Witnesses:
W. CLYDE CAMP,
CHARLES W. OVERTURF.